Patented Apr. 27, 1948

2,440,612

UNITED STATES PATENT OFFICE 2,440,612

SEPARATION OF COPPER

Myrl Lichtenwalter, Old Greenwich, Conn., assignor to Nicaro Nickel Company, New York, N. Y., a corporation of Delaware No Drawing. Application September 12, 1942, Serial No. 458,137

10 Claims. (Cl. 75—117)

This invention relates to the recovery of copper from various solutions containing the same either alone or in combination with other substances, as compounds of nickel, cobalt and other metals. More specifically it relates to the separation of copper from leaching solutions and from ammoniacal and other alkaline solutions containing copper in admixture with nickel.

It has been suggested that copper and as well nickel and cobalt could be separated from oxide, silicate and roasted sulfide ores containing such metals together with other metals such as iron, by subjecting the ore in finely divided condition to reducing gases at high temperatures, and separating the copper, nickel and cobalt from the reduced ore after the same is cooled by leaching the same with a solution of any one of a number of ammonium salts alone or in admixture with ammonium hydroxide, the leaching being carried out during aeration.

A specific purpose of the present invention is to provide a process for separating the copper content from such solutions while leaving the nickel and other common metals in solution.

In accordance with one embodiment of the present invention, copper is recovered from ammoniacal leaching solutions containing the same with other metals by preliminarily reducing the copper in the solutions to the cuprous state by any one of a number of treatments, next precipitating the reduced copper salts formed by converting the same into copper acetylide, and then separating said acetylide precipitate from the solution by filtering, decanting or other treatment, leaving the nickel and other compounds in the solution. If silver or gold compounds are present in the leaching solution treated, then these compounds will precipitate out with the copper. If desired, the two metals may be recovered from the leaching solution by preliminary treatments, in which case the copper will be precipitated in a substantially pure state.

The copper acetylide obtained, which should not be permitted to dry in view of its explosive properties when in such condition, is thereafter treated for the recovery of the metallic copper preferably by reacting the same with a solution of a mineral acid such as sulfuric or hydrochloric acid, thereby forming a copper salt of the acid employed, as copper sulfate, which salt may thereafter be decomposed either by stripping the copper through cementation on scrap iron or by electrolytic reduction.

In the above process and in accordance with a limited embodiment of the invention, purer copper may be produced by including an additional step involving washing the precipitated copper acetylide with a quantity of fresh ammoniacal leaching solution, this treatment serving to dissolve out any nickel or dissolved metal from the original leach solution.

In the foregoing process, the reduction of the cupric copper in the original ammoniacal leaching solution may be satisfactorily effected by contacting such solution with metallic copper in an inert atmosphere. Other reducing agents and processes, however, may be employed.

In a special embodiment of the present invention, the reduction of the copper is carried out during the leaching operation itself. To effect this additional function, the leaching is conducted in a countercurrent manner in two or more stages, preferably three or four, and the first stage instead of being accompanied by aeration is effected in the absence of oxygen. In operating under this novel procedure, the cupric ammonium complexes leached out in the stages after the first stage leaching, are reduced to the cuprous state by the action of the metallic copper contained in the fresh reduced ore. The cupric complexes in the leaching solution take up and leach out part of the metallic copper.

The process of the present invention is particularly applicable to copper-containing ammoniacal leaching solutions obtained by leaching with an aqueous solution of ammonium carbonate or of a mixture of such salt with ammonium hydroxide. Other known copper-containing ammoniacal solutions, however, may also be treated.

The formation of the copper acetylide in the treated solution containing the copper in the cuprous state may be easily effected simply by the introduction of acetylene, the said gas being introduced until the copper content has precipitated out. This action may be assisted by agitation and by a slight superatmospheric pressure of acetylene over the solution being treated. The reaction proceeds satisfactorily at room temperatures but higher or lower temperatures may be employed. The formation of the copper acetylide may alternatively be effected by the addition of organic acetylides of the formula $R—C\equiv C—H$, such as methyl acetylide or by the addition of compounds yielding acetylene in the solution, any one of the numerous inorganic acetylides unstable in water being suitable. Because of its ease of operation and cheapness, gaseous acetylene is preferred.

Example

An ammoniacal leaching solution containing 1.72 g. of nickel and 0.322 g. of copper per 100 cc. of solution and obtained by leaching a mixed silicate-oxide ore containing such metals with an aqueous solution containing 3% ammonia as ammonium hydroxide and 3% ammonia as ammonium carbonate was contacted with an excess of metallic copper in an inert atmosphere until the cupric copper present was reduced to the cuprous state. Through this treatment the copper concentration in the solution rose to 0.57 g. per 100 cc. of solution. Thereupon acetylene gas was introduced into the solution until the copper content, which was in the form of a cuprous ammonium carbonate complex, was completely precipitated out in the form of copper acetylide.

The copper acetylide obtained was then separated from the liquid solution by filtration and thereafter was washed with fresh ammonia leaching solution. (An analysis of the purified precipitate showed the complete absence of nickel. Furthermore, an analysis of the filtrate showed that no copper whatsoever remained therein.) To each 150 g. of the copper acetylide precipitate suspended in 400 ml. of water were slowly added 100 g. of concentrated sulfuric acid, the reaction mass being cooled in order to avoid the possible formation of vinyl compounds of acetylene, 30° C. being satisfactory. The reaction mass is stirred until all the copper goes into solution. The acetylene is regenerated by this reaction and collected, and is purified, if necessary, before reuse in the process. The solution of copper sulfate obtained was then subjected to electrolytic reduction in accordance with known procedure, whereby the copper was obtained in a pure state and the sulfuric acid was regenerated for reuse in the process.

The nickel-containing leaching solution remaining after the separation of the copper acetylide is thereafter treated in known manner for the separation of the nickel content or other metals present therein, a satisfactory method of removing the nickel being to precipitate the same by distilling off the ammonia.

The present process has several operational advantages as follows:

The copper content is separated in substantially quantitative amounts. In the absence of silver and gold, the copper is separated in an extremely high state of purity. Furthermore, when nickel compounds are also present in the ammoniacal solution, the copper is so completely separated therefrom that it is not found in any appreciable or objectionable quantity in the nickel subsequently recovered from the solution.

The acetylene employed in the process is recovered and may be reused in the production of additional acetylide from another batch of copper-containing ammoniacal leaching solution. The combination of the step involving the treatment of the copper acetylide with the mineral acid in conjunction with the step involving the reuse of the acetylene formed for precipitating additional copper from the ammoniacal leaching solution is of material economical value and within the purview of the present invention.

In obtaining the copper in metallic form from the copper sulfate or other salt, the regeneration of the sulfuric acid or other acid is also of material economic advantage for such regenerated acid may thereafter be employed in the treatment of additional quantities of the copper acetylide.

It should be understood that the present invention is not limited to the exact procedures and conditions outlined herein nor to the specific compounds mentioned, for it extends to all modifications and variations within the scope of the claims appended hereto.

I claim:

1. A process for separately recovering the copper content and the nickel content from ammoniacal ammonium carbonate leaching solutions which comprises subjecting such solution to reducing conditions until the copper is reduced to the cuprous state, converting the cuprous ammonium carbonate formed into a copper acetylide precipitate, and separating said precipitate from the solution containing the nickel and from which solution the nickel may be precipitated in a condition free of copper.

2. A process for recovering the copper content and the nickel content from reduced silicate ores containing such metals which comprises dissolving out said metal contents by countercurrent flow of an ammoniacal ammonium carbonate leaching solution in at least two stages, each of which except the first is effected in the presence of oxygen, whereby in the first stage the cupric copper salts formed in the leaching solution are reduced to the cuprous state by the action of, and by taking up copper in the reduced ore, introducing acetylene into said solution until copper acetylide is formed as a precipitate, and separating said precipitate from the solution containing the nickel content and from which solution the nickel may be precipitated out in a condition free of copper.

3. A process for separating the copper content from ammonium hydroxide-ammonium carbonate leaching solutions containing copper and nickel compounds which comprises reducing the copper to the cuprous state in such solution, converting the reduced copper compounds formed into the copper acetylide precipitate and separating said precipitate from the remaining solution.

4. A process for separating the copper content from ammonium hydroxide-ammonium carbonate leaching solutions containing copper and nickel compounds which comprises contacting such solution with metallic copper in an inert atmosphere until the copper is reduced to the cuprous state, introducing acetylene into such treated solution until the copper separates out as copper acetylide and separating out said copper acetylide from the remaining solution.

5. A process for recovering the copper content and the nickel content from reduced silicate ores containing such metals which comprises dissolving out said metal contents by countercurrent flow of an ammonium hydroxide-ammonium carbonate leaching solution in at least two stages, each of which except the first is effected in the presence of oxygen, whereby in the first stage the cupric copper salts formed in the leaching solution are reduced to the cuprous state by the action of and by taking up metallic copper in the ore, converting the cuprous salts in the solution into copper acetylide which precipitates out and then separating said precipitate from the remaining solution.

6. A process for obtaining the copper content in metallic form from ammoniacal ammonium carbonate leaching solutions containing nickel compounds in addition to the copper which comprises reducing the copper compounds present to the cuprous state, introducing acetylene into the treated solution until the copper content precipitates out as copper acetylide, separating the copper acetylide from the remaining solution, reacting the copper acetylide with a mineral acid to form a copper salt of such acid and separating the copper in metallic form from said salt.

7. A process for obtaining copper salts from ammoniacal ammonium carbonate leaching solutions containing copper and nickel compounds which comprises reducing the copper content to the cuprous state, introducing acetylene into the treated solution until the copper precipitates out in the form of copper acetylide, reacting the copper acetylide obtained with a mineral acid whereby a copper salt of such acid is obtained and acetylene is regenerated and reemploying the latter in forming additional copper acetylide.

8. A process for obtaining copper from ammoniacal ammonium carbonate leaching solutions containing cuprous copper and nickel compounds, which comprises precipitating out the copper content in the form of copper acetylide, separating said precipitate from the remaining solution, reacting the copper acetylide precipitate with sulfuric acid thereby forming copper sulfate and acetylene, separating the copper sulfate and the acetylene, collecting the acetylene and again employing the same for the formation of additional copper acetylide, decomposing the copper sulfate formed into metallic copper with regeneration of sulfuric acid and collecting the sulfuric acid and again employing the same for forming additional copper sulfate.

9. A process for separating the copper content from ammonium hydroxide-ammonium carbonate leaching solutions containing copper and nickel compounds which comprises reducing the copper content to the cuprous state by contacting the solution with metallic copper, introducing acetylene into said treated solution until the copper content is precipitated in the form of copper acetylide, separating the copper acetylide precipitate from the remaining solution, and separating the copper from the copper acetylide.

10. A process for obtaining the copper content in metallic form from reduced silicate ores containing copper, nickel and other metals which comprises dissolving out the copper and nickel contents by countercurrent flow of an ammonium hydroxide-ammonium carbonate leaching solution in at least two stages, each of which except the first is effected in the presence of oxygen, whereby in the first stage the cuprous copper salts formed in the leaching solution are reduced to the cuprous state by reacting with and taking up metallic copper in the ore, introducing acetylene into the leaching solution obtained until the copper content precipitates as copper acetylide, separating the copper acetylide precipitate from the remaining solution, reacting the copper acetylide with a mineral acid to form a copper salt of said acid and decomposing the copper salt formed thereby obtaining the copper in metallic form.

MYRL LICHTENWALTER.

REFERENCES CITED

The following references are of record in the file of this patent:

UNITED STATES PATENTS

| Number | Name | Date |
| --- | --- | --- |
| 651,509 | Martino et al. | June 12, 1900 |
| 1,487,145 | Caron | Mar. 18, 1924 |
| 1,544,197 | Terry | June 30, 1925 |
| 1,570,858 | Perkins | Jan. 26, 1926 |
| 1,686,391 | Muller et al. | Oct. 2, 1928 |
| 1,887,037 | Peek et al. | Nov. 8, 1932 |

FOREIGN PATENTS

| Number | Country | Date |
| --- | --- | --- |
| 13,851 | Great Britain | July 18, 1894 |

OTHER REFERENCES

Modern Inorganic Chemistry, J. W. Mellor, 1925 edition, page 858.

Comprehensive Treatise on Inorganic & Theoretical Chemistry, Mellor, vol. 15, page 21.

Organic Chemistry, Whitmore, 1937, page 65.

World Engineering Congress, Tokyo, 1929. Proceedings, vol. 35, part 3, pages 224, 225.

Chemical Abstracts, vol. 3, page 2918.